Oct. 22, 1929.  R. THOMPSON  1,732,919
ANIMAL TRAP
Filed July 18, 1925
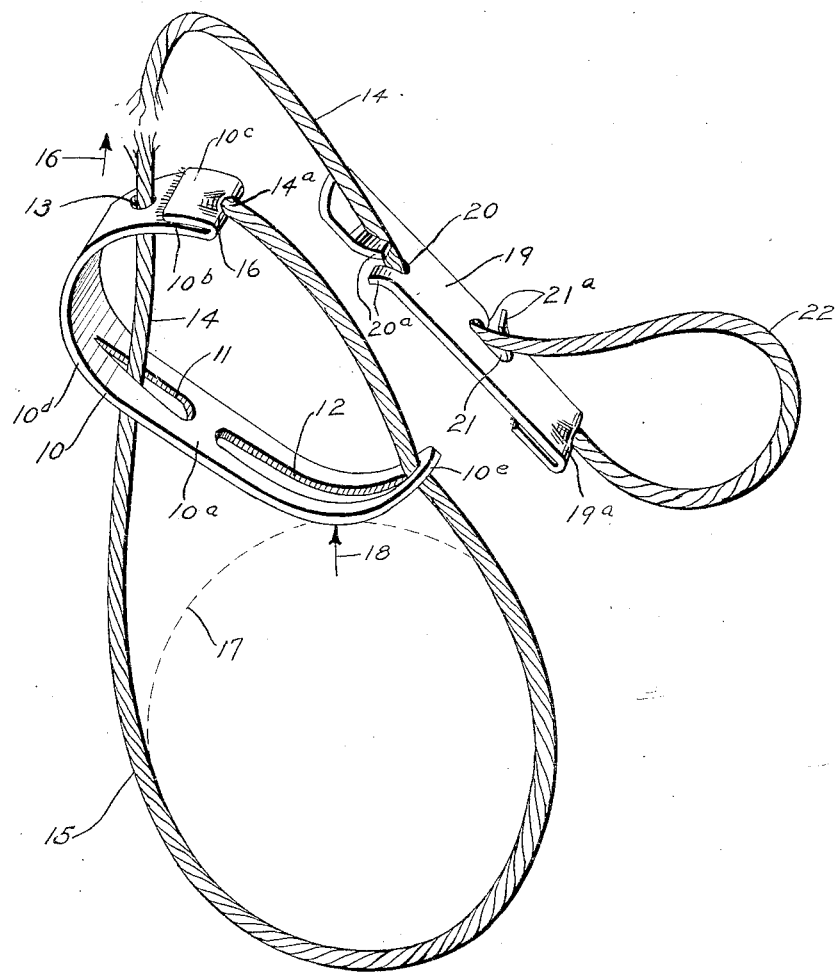

Patented Oct. 22, 1929

1,732,919

UNITED STATES PATENT OFFICE

RAYMOND THOMPSON, OF DANBURY, CONNECTICUT, ASSIGNOR OF ONE-HALF TO JAMES F. DORAN AND JOHN C. DORAN, COPARTNERS DOING BUSINESS UNDER THE NAME OF DORAN BROTHERS, OF DANBURY, CONNECTICUT

ANIMAL TRAP

Application filed July 18, 1925. Serial No. 44,453.

This invention relates to animal traps. One of the objects thereof is to provide an animal trap which is practical and efficient and capable of dependable operation. Another object is to provide such a device which is adapted to kill the trapped animal quickly and without damage to the pelt. Other objects are to provide a device of the above nature which is inexpensive, simple in construction and convenient to manipulate, and which may be used repeatedly without detriment or danger of decreasing its efficiency and dependability. Another object is to provide an animal trap which may be used under all conditions and which is unaffected by freezing or other unfavorable weather conditions. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of the various possible embodiments of the invention, the single figure shows the trap in perspective.

Referring now to the drawing in detail, there is shown a member 10 which preferably takes the form of a strip of substantially rigid sheet metal such as a suitable steel. This metal strip comprises a main body portion $10^a$, the end $10^b$ of which, the left-hand portion thereof as viewed in the drawing, is curved and bent over at an angle to the main portion $10^a$. In the main body portion $10^a$ is formed a tapered or V-shaped slot 11, the narrowed end of which is directed toward the bent over end portion $10^b$. Adjacent the opposite end of the part $10^a$ is a second longitudinal slot 12, and it will be noted that this latter end of the member $10^a$ is also bent over, or upwardly as viewed in the drawing, for a purpose which will be described presently. It will be seen that the bent over end portion $10^b$ overhangs the portion of the main body $10^a$ having therein the tapered slot 11.

Passing through an opening 13 in the part $10^b$ and thence downwardly through the tapered slot 11 is a cable 14. This cable is preferably a metal cable and, moreover, is preferably made of hardened steel so that a trapped animal will be unable to bite through the cable. On the side of the body part $10^a$ opposite the bent over part $10^b$ the cable 14 forms a loop, indicated generally by the numeral 15, and passes back upon itself through the slot 12. The end $14^a$ of the cable is secured in any suitable manner to the end of the bent over part $10^b$. This securing is preferably accomplished by passing the end of the cable through an opening 16 in the end portion of the part $10^b$, and thereupon transversely bending over the end of the part $10^b$ along the line of this opening and clamping the bent end part $10^c$ down against the cable end as by the blow of a hammer. In this manner a secure joining of the parts is had without the necessity of attempting to bend the stiff steel cable into a knot.

In operation, the parts just described are positioned with the loop 15 in the path of an animal. The cable 14 may be secured at its outer end to a suitable spring device such as a bent over tree or bush provided with a suitable releasing mechanism. When an animal enters the loop 15 and the releasing mechanism of the spring device is operated, the cable 14 is jerked upwardly as indicated by the arrow 16, and the loop or noose 15 tightens about the body of the animal. Preferably, when a spring device is employed, such as a bent over tree or sapling, it is arranged so that the animal, within the loop 15, will be swung clear of the ground.

When a tree or sapling suitable for a spring device is not available, the end of the cable 14 is fastened to any natural anchorage such as a larger tree or a clump of bushes. The pulling of the trapped animal in attempting to pull away from the trap and free itself then tightens the noose about the body of the animal as will be described.

An animal within the trap is diagrammatically indicated by the dotted line 17. It will be seen that the body portion $10^a$ of the metal strip 10 forms one side, namely the upper side, of the loop or noose 15. The passage of the cable 14 through the opening 13 in the bent over end part 10$^b$ holds the cable in such position with respect to the part 10$^a$, and hence with respect to the tapered slot 11, as the animal pulls and struggles in attempting to get away the cable will slip through in a direction to cause a tightening of the noose 15 around the animal. The animal, whether upon the ground or suspended in the air, exerts a strong pull outwardly upon the loop 15 and in a direction away from the member 10. The stronger the pull in this direction the tighter the noose becomes. The only force which the animal is able to exert tending to enlarge the noose is the pressure effected by expansion of its muscles and breathing, and such pressure is not sufficient to cause the cable to slip through the tapered slot. Moreover, such expansion of the body of the animal causes an upward pressure on the part 10$^a$, as indicated by the arrow 18. The effect of this pressure is to jam the cable 14 tightly into the tapered slot 11 to prevent effectively slipping of the cable through the slot 11 in a direction to enlarge the loop 15 and release the pressure upon the animal. This results because the pressure applied as indicated by the arrow 18 tends to swing the member 10$^a$ about the part 10$^b$, or about the opening 13 therein through which the cable 14 passes, and thus moves the narrowed end of the slot 11 tightly into wedging relation with the cable 14.

Thus, when an animal is caught within the noose 15, its struggles to free itself are wholly ineffective, and the noose is not permitted to enlarge in the least. Instead, the noose rapidly tightens and the life is soon crushed out of the trapped animal. The animal is thus quickly killed without unnecessary suffering and, moreover, the pelt is not damaged by a lengthy struggle of the animal in its attempts to free itself. The end portion 10$^c$ of the member 10, being curved upwardly, as mentioned above, avoids any possibility of this part digging into the animal and injuring the pelt. Also, because of this bend of the metal the animal presses at 18 against a curved surface of the member 10. This curved portion slips readily over the body of the animal and permits the leverage about the opening 13 to act freely. In order to release the trap to remove the animal therefrom, it is necessary simply to slide the member 10 upwardly along the cable 14 by a pressure applied at the part 10$^d$.

As has been mentioned above, the outer end of the cable 14 is preferably secured to a suitable tree or bush. Since the hardened steel cable is relatively stiff and resilient, the problem of securing it as required presents peculiar difficulties. It is impracticable to tie a knot in the cable and the trapper ordinarily does not have at hand tools adapted for use in securing the end of the cable to a natural anchor.

In order to permit the cable 14 to be conveniently secured at its end to a tree or the like, and to permit its convenient removal for repeated use, there is preferably secured to the end of the cable 14 of this trap a plate 19 which is preferably of substantially rigid sheet metal. At one end 19$^a$ of this metal strip is secured the end of the cable 14, preferably in the same manner as the opposite end of the cable is secured to the end part 10$^b$ of the member 10 in the trap. The strip 19 is provided with a pair of longitudinal slots 20 and 21 through which the cable 14 is adapted to be passed, as shown in the drawing. There is thus formed a loop 22 which may encircle a tree or bush to which the trap is to be secured. The metal of the strip 19 is cut through transversely from the slots 20 and 21 to an edge of the member. The metal is then bent outwardly, as shown at 20$^a$ and 21$^a$, to provide a path for insertion and removal of the cable 14 to and from the slots.

In operation, the end plate 19 is passed around the tree or bush and then the cable is slipped laterally into place in the slots 20 and 21. The lugs 20$^a$ and 21$^a$ prevent accidental displacement and the end of the cable 14 is thus dependably secured. It is a simple matter to slip the cable out of the slots 20 and 21 when it is desired to remove the trap.

From the foregoing, it will be seen that there is herein provided a device which achieves the objects of this invention including many practical and useful advantages. The trap is simple and inexpensive and thoroughly dependable in action. There are no parts which are subject to being clogged by dirt or ice to render the trap inoperative. The parts are sturdily constructed and the trap may be used repeatedly with entire consistency of results.

As many possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim as my invention:

1. In an animal trap, in combination, a strip member comprising a main body portion and a part at one end thereof bent over at an angle to said main body portion, and a metal cable positively secured at its end to said bent over part, passing therefrom through said main body portion, thence looped back through said main body portion and thence passing through said bent over part adjacent said end connection therewith.

2. In an animal trap, in combination, a strip member comprising a main body portion and a part at one end thereof bent over at an angle to said main body portion, and a metal cable passing through said bent over part and thence through an opening in said main body portion and forming a loop on the side thereof opposite said bent over part, and having its end positively secured to said bent over part substantially at the end thereof, said loop being adapted to encircle the body of an animal, and said opening being shaped to prevent slipping of said cable therethrough in a direction to enlarge said loop as the animal struggles.

3. In an animal trap, in combination, a strip of metal comprising a main body portion and a part at one end thereof bent over at an angle to said main body portion, and a metal cable passing through an opening in said bent over part and thence through a slot in said main body portion, thence back to said bent over part and made fast thereto and thereby providing a loop of which said body portion forms a side, said loop being adapted to encircle the body of an animal, said slot in said main body portion being tapered, and said opening in said bent over portion coacting with said slot to hold said cable so that pressure of the animal upon said main body portion wedges said cable in said tapered slot and prevents slipping thereof in a direction to enlarge said loop.

4. In an animal trap, in combination, a strip member comprising a substantially straight body portion, a longer end portion bent upwardly and partially over said body portion and a shorter end portion also curving upwardly from said body portion and having openings cutting through said strip at a plurality of points lengthwise thereof, and a cable attached to said longer end portion adapted to be strung through said openings to provide a loop upon the back side of said strip of which the shorter end portion forms a part tending to jam said cable in one of said openings when said cable is put under tension and pressure brought to bear against said shorter end portion.

5. In an animal trap, in combination, a member having formed in a portion thereof a tapered slot, means secured to said member overhanging said slotted portion thereof and spaced therefrom, a cable passing through said last means, through said slot, forming a loop on the side of said member opposite said means, thence passing through an elongated opening in said member and secured at its end to said means, said loop being adapted to encircle the body of an animal, and said means being adapted to hold said cable with respect to said member so that struggling of the animal wedges said cable in said tapered slot and prevents slipping thereof in a direction to enlarge said loop.

6. In an animal trap, in combination, a metal strip having therein a tapered slot and a bent end portion overhanging the portion thereof having said slot, a cable passing through said end portion and through said slot and providing a loop on the side of said strip opposite said bent over end portion, said loop being adapted to encircle the body of an animal, a part of said strip forming a side of said loop and positioned so that pressure of the animal thereon tends to swing said member about said bent over end portion and wedges said cable tightly into said slot.

7. In an animal trap, in combination, a metal strip having therein a tapered slot and a bent end portion overhanging the portion thereof having said slot, a cable passing through said end portion and through said slot and providing a loop on the side of said strip opposite said bent over end portion, and thence passing back through a second slot in said strip and secured at its end to said bent over end portion, a part of said strip thus forming a side of said loop, said loop being adapted to encircle the body of an animal and said part of said strip being so positioned that pressure of the animal thereon tends to swing said strip about said bent over end portion thereof and to wedge said cable into said slot.

In testimony whereof, I have signed my name to this specification this 13th day of July, 1925.

RAYMOND THOMPSON.